United States Patent Office 2,902,274
Patented Sept. 1, 1959

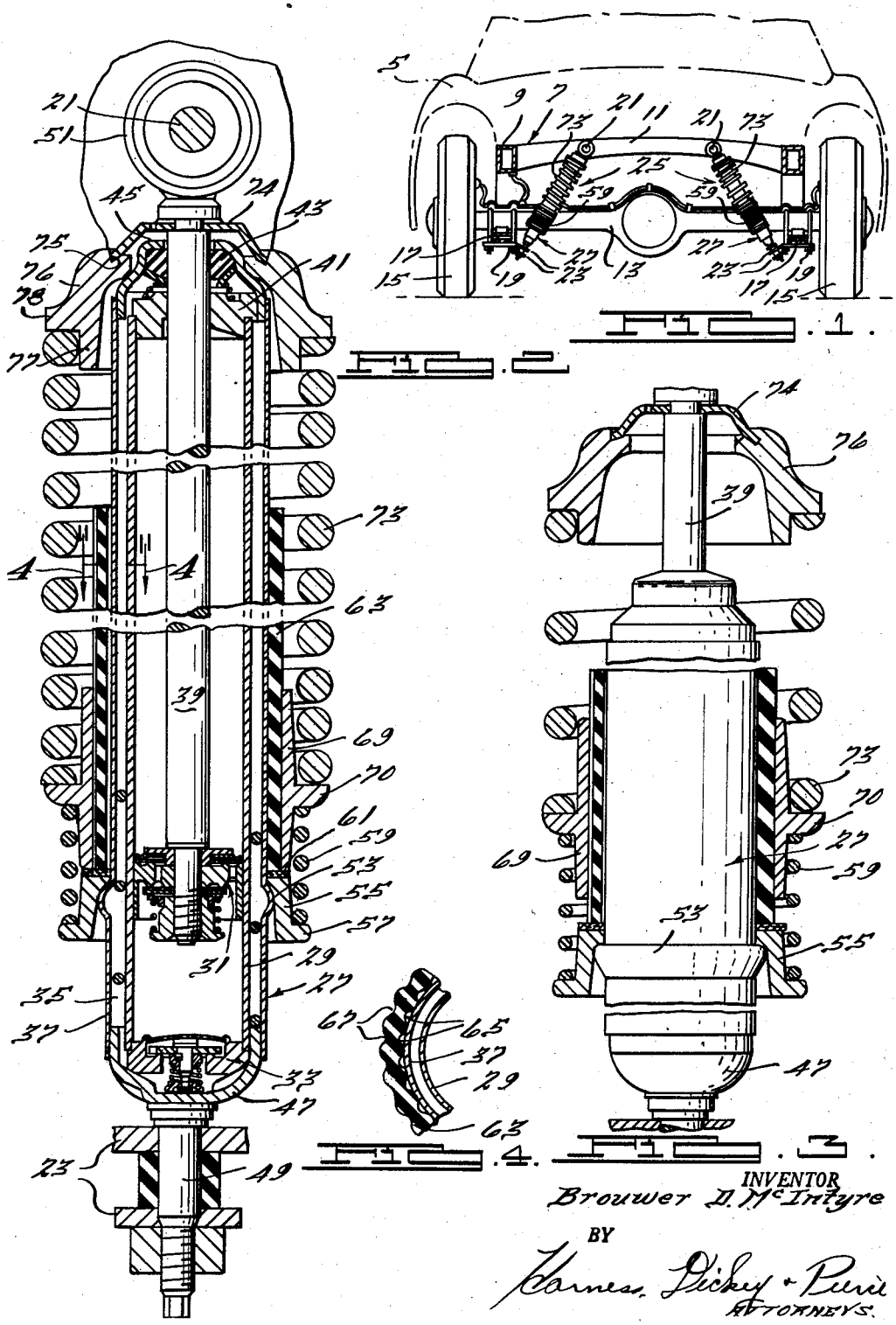

2,902,274

VEHICLE SUSPENSION SYSTEM

Brouwer D. McIntyre, Monroe, Mich., assignor to Monroe Auto Equipment Company

Application February 21, 1958, Serial No. 716,690

2 Claims. (Cl. 267—8)

This invention relates generally to a vehicle suspension system and more porticularly to auxiliary suspension devices adapted to be used, for example, on vehicles in conjunction with vehicle main springs so as to provide improved suspension characteristics when a vehicle is both lightly loaded and heavily loaded, and constitutes an improvement over the structure shown in the copending application of Brouwer D. McIntyre and William D. McIntyre, Serial No. 665,001, filed June 11, 1957, now Patent No. 2,874,955, granted Feb. 24, 1959, entitled "Vehicle Suspension System."

While the auxiliary suspension devices shown in the aforementioned copending application have been highly successful and hundreds of thousands of such devices have been sold, it has been noted that when the devices are installed on an automobile, the back end of the automobile body is raised a few inches higher than normal, when the automobile is empty or lightly loaded. While this has not proven to be a serious problem, some people feel that this is undesirable from an appearance standpoint and would prefer a suspension having the same desirable load carrying characteristics without raising the back end of the automobile body more than a nominal amount, when the automobile is empty or lightly loaded.

It is, therefore, an object of this invention to provide improved auxiliary suspension devices which can be easily and quickly mounted on a vehicle in place of the rear shock absorbers and which will only raise the height of the back end of the vehicle body a nominal amount when the vehicle is unloaded, while at the same time automatically leveling a vehicle body for both light and heavy loads without upsetting the vehicle suspension system balance so that bottoming of the vehicle frame and rear axle and upward tilting of the vehicle headlights will be substantially eliminated without destroying the comfortable ride characteristics of the vehicle.

It is a still further object of this invention to provide a device of the aforementioned type which is relatively inexpensive to manufacture, efficient in operation and durable in construction.

These and other objects of this invention will become apparent from the following detailed description taken in conjunction with the accompanying drawing in which:

Figure 1 is a rear elevational view of a vehicle partially broken away in section and in phantom, showing the suspension system of this invention, Fig. 2 is a sectional view of an auxiliary suspension device of this invention with the shock absorber and springs shown in their compressed position, Fig. 3 is a view, partially in section and partially in elevation of the suspension device illustrated in Fig. 2 and showing the relative position of the springs and shock absorber when the shock absorber is in an extended position, and Fig. 4 is a fragmentary sectional view of the structure illustrated in Fig. 1 taken along the line 4—4 thereof.

Referring now to the drawing, it will be seen that a vehicle is illustrated having a body 5 and chassis frame 7, which includes longitudinal members 9 and a lateral cross frame member 11, suspended at the rear thereof on a rear axle 13 and ground engaging wheels 15 by leaf springs 17, adjacent each wheel 15. The springs 17 are connected by suitable spring shackles, not shown, to the chassis frame and by suitable bolt and bracket assemblies 19 to the housing of the axle 13. On conventional automotive vehicles, hydraulic direct acting tubular shock absorbers are provided adjacent each of the springs 17 and for this purpose a stud or pin 21 is provided on the lateral cross frame member 11 adjacent each wheel 15 and a suitable supporting bracket portion 23 is provided on each spring bracket and bolt assembly 19. The opposite ends of the shock absorber are thus connected between the sprung and unsprung assemblies of the vehicle. The auxiliary suspension devices 25 of this invention are mounted in place of the conventional shock absorbers, adjacent the rear wheels of the vehicle, so as to provide an auxiliary rear suspension for the vehicle.

Each suspension device 25 incorporates a hydraulic tubular direct acting shock absorber 27 which includes a pressure cylinder 29 within which a ported and valved piston assembly 31 is slidably supported. The lower end of the pressure cylinder is closed by means of a base valve assembly 33 which permits hydraulic fluid to flow between the pressure cylinder and a reservoir 35 provided between the pressure cylinder and a reserve tube 37, which concentrically surrounds the pressure cylinder in spaced relationship therewith. A piston rod 39 is connected to the piston assembly 31 and extends upwardly through a rod guide assembly 41 which closes the upper end of the pressure cylinder and through a seal assembly 43 which, in conjunction with a cap 45, closes the upper end of the reserve tube 37. The lower end of the reserve tube 37 is closed by means of an end cap or closure 47. The shock absorber piston assembly 31 and base valve assembly 33 are both ported and valved as described in detail in the copending application, Serial No. 665,001, so as to properly co-operate with the vehicle main and auxiliary suspension springs and thereby provide comfortable and desirable vehicle riding characteristics under various load conditions.

Each suspension device has a stud type end fitting 49 on the lower end of the shock absorber which is connectible to the vehicle spring bracket portion 23 in the same manner as a conventional shock absorber, while the upper end of the piston rod 39 of each suspension device has a loop-type fitting 51 thereon which is adapted to be connected to a pin 21 on the vehicle frame in the same manner as a conventional shock absorber.

An annular shoulder or projection 53 is formed in the wall of the reserve tube 37 adjacent to, but above, the lower end thereof. An annular rigid spring support member 55 is sleeved over the upper end of the shock absorber and abuts the annular shoulder 53 on the reserve tube. The spring support member 55 is provided with an annular flange 57 on the lower end thereof which engages and supports the lower end of a first coil spring 59. A rubber, fiber or plastic washer 61 is sleeved over the top of the shock absorber and engages the top surface of the spring support 55. An elongated tubular spacer 63 is sleeved over the top of the shock absorber and rests upon the washer 61. The tubular sleeve 63 may be made of a suitable material such as rubber, fiber or plastic and the inner and outer walls thereof are corrugated at 65 and 67 respectively. The inside corrugations permit air to flow between the reserve tube and the spacer 63 so that the shock absorber will be properly cooled at all times, while the outer corrugations reduce friction between the spacer and a slidable sleeve-like support member 69 which is sleeved over the top of the shock absorber and which has an annular flange 70, intermediate the ends thereof, which engages the top of the first coil spring 59. The spacer 63 acts not only as a slide support for the sleeve 69 but also co-operates in maintaining the coil springs which surround the shock absorber in a concentric relationship with the reserve tube, and also prevents metal to metal contact between the springs and the reserve tube.

A second coil spring 73 is sleeved over the top of the shock absorber and the lower end thereof engages the top of the annular flange 70 of the slidable sleeve support 69. The upper end of the second coil spring 73 is connected with the piston rod 39 by means of a hat-shaped support member 74 which has its inner periphery connected with the piston rod and its lower or outer periphery engaged in an annular notch or groove 75 formed in the upper end of a split collar or ring 76. The collar or ring is split into halves and has a depending annular flange 77 on the lower end thereof which is adapted to engage the inner diameter of the coil spring 73, at the upper end thereof, and the collar has a horizontally disposed shoulder 78 immediately above the flange 77 which engages the top of the coil spring 73. The split ring or collar 76 is inserted into engagement with the upper end of the spring 73 and with the support 74 by compressing the spring slightly and slipping the two halves into position separately. When both ring halves are in position the spring 73 is thereby unitarily assembled with the shock absorber 27 so that an auxiliary suspension unit or device is provided which can be mounted on a vehicle as previously described.

It will likewise be appreciated that the unit may be easily disassembled in case of any damage or inoperative conditions simply by removing the two halves of the split ring 76 after compressing the springs 73 and 59 slightly. Thereafter, the springs, spacers and supports can be easily removed.

The first coil spring 59 has a rate of the order of 20 pounds while the second coil spring 73 has a rate of the order of 60 to 80 pounds. The first coil spring 59 is of a sufficient length that it will keep the top of the second coil spring 73 in engagement with the split collar 76 even when the shock absorber is fully extended as illustrated in Fig. 3. It will, however, be noted that when the unit is compressed, the lower end of the slidable sleeve support 69 engages the washer 61, which is supported on the spring support member 55, before the spring 59 is fully compressed, thus providing a rigid support for the lower end of the spring 73 during additional compression of the spring 73.

Because the spring 59 is considerably lighter than the spring 73, it will be at least partially compressed by the weight of the vehicle sprung assembly, even when the vehicle is not loaded by either passengers or baggage or other merchandise. That is, the rate of spring 59 is such that it will, when there are about two people in the vehicle, be compressed to the extent shown in Fig. 2. On the other hand, spring 73 will be only slightly compressed when the bottom of the sleeve 69 first engages the spring support 55. Thereafter, as additional load is put in the vehicle in the form of passengers, baggage or other merchandise, the spring 73 will be additionally compressed.

Tests have shown that while the suspension devices shown in applicants' aforementioned copending patent application will increase the unloaded vehicle sprung assembly height one to two inches, the devices of this invention will only cause about ¼ inch increase in height. Furthermore, the device of this invention will reduce deflection of the sprung assembly under heavy loads approximately 2200 pounds, about two inches, as compared to a standard vehicle not incorporating the devices of this invention. Thus, clearance between the axle and frame of a vehicle is increased from about one inch to about three inches. Therefore, even at full vehicle loads, the devices of this invention keep the vehicle headlight beams on the road, materially reduce suspension bottoming, improve vision from the vehicle and improve the handling characteristics of the vehicle. This is accomplished without adding harshness to the riding characteristics of the vehicle, even when lightly loaded, all as specifically pointed out in applicants' aforementioned copending application.

What is claimed is:

1. In a suspension device, a hydraulic direct acting tubular shock absorber including an elongated tubular pressure cylinder, a bore-fitting piston slidably disposed in said pressure cylinder and adapted to control flow of hydraulic fluid therepast to opposite sides thereof, a reserve tube concentrically surrounding said pressure cylinder in spaced relation thereto, valve means closing one end of said pressure cylinder and communicating said pressure cylinder and said reserve tube, means closing the end of said reserve tube adjacent said pressure cylinder valve means, a piston rod connected with said piston and projecting beyond the opposite ends of said pressure cylinder and reserve tube, closure means closing said opposite ends of said pressure cylinder and reserve tube and slidably receiving said piston rod, means on said one end of said reserve tube and on the projecting end of said piston rod adapted to be connected with relatively movable assemblies, a first coil spring sleeved over said reserve tube, an annular shoulder formed in the wall of said reserve tube adjacent said one end thereof, a support member sleeved over said reserve tube and engaging said annular shoulder and one end of said first coil spring so as to support said one end of said first coil spring on said reserve tube, a sleeve member slidably disposed on said reserve tube, an annular flange formed on said sleeve member intermediate the ends thereof and engaging the opposite end of said first coil spring, one end of said sleeve member being engageable with said support member when said first coil spring is compressed and prior to full compression thereof, a second coil spring sleeved over said reserve tube and having one end thereof engaging said sleeve member flange, a split ring-like support engaging the opposite end of said second coil spring and removably connected with said piston rod adjacent the projecting end thereof so as to support the opposite end of said second coil spring on said piston rod, said first coil spring having a substantially lower spring rate than said second coil spring and being of a substantially shorter length than said second coil spring, said first coil spring being of a length sufficient to maintain said second coil spring in engagement with said split ring-like support when said shock absorber is in its fully extended position.

2. In a suspension device, a hydraulic direct acting tubular shock absorber having relatively movable telescopic parts, a first coil spring disposed substantially concentrically with respect to said shock absorber, means on one of said shock absorber parts engaging and supporting one end of said first coil spring, a second coil spring disposed concentrically with respect to said shock absorber, a support member slidably disposed on said one shock absorber part and engaging the opposite end of said first spring and one end of said second spring, and means on the other of said shock absorber parts engaging the opposite end of said second spring, said support member being engageable with said one shock absorber part spring supporting means when said first coil spring is compressed a predetermined amount and prior to full compression thereof, said first coil spring having a substantially lower spring rate than said second coil spring so that when a load is applied to said device said slidable support member will engage said one shock absorber part spring supporting means prior to any substantial compression of said second spring, said first spring being of a substatnially shorter length than said second spring, said first spring being of a length sufficient to maintain said second coil spring in engagement with said other shock absorber part spring supporting means when said shock absorber is in its fully extended position.

References Cited in the file of this patent

FOREIGN PATENTS

| | | |
|---|---|---|
| 559,350 | France | June 14, 1923 |
| 163,163 | Australia | Mar. 11, 1954 |
| 20,866 | Germany | Aug. 9, 1956 |